United States Patent [19]
Kambara

[11] 3,934,708
[45] Jan. 27, 1976

[54] FLEXIBLE BELT CONVEYOR SYSTEM WITH TRACK-CONTAINED ROLLER, CARRIER AND CHAIN ASSEMBLY

[76] Inventor: Goro Kambara, 1528 Osceola St., Denver, Colo. 80204

[22] Filed: June 24, 1974

[21] Appl. No.: 482,593

[52] U.S. Cl............................... 198/109; 198/189
[51] Int. Cl.² .......................................... B65G 41/00
[58] Field of Search ........... 198/109, 137, 189, 195, 198/177, 108, 182, 181, 201, 202

[56] References Cited
UNITED STATES PATENTS

| | | | |
|---|---|---|---|
| 2,344,476 | 3/1944 | Turnbull | 198/177 R |
| 3,045,808 | 7/1962 | Blanc | 198/177 R |
| 3,266,620 | 8/1966 | Skinner | 198/177 R |
| 3,563,203 | 2/1971 | Stiltner | 198/177 R |
| 3,595,380 | 7/1971 | Miller | 198/203 |
| 3,707,218 | 12/1972 | Payne et al. | 198/109 |
| 3,749,229 | 7/1973 | Napadow | 198/177 R |
| 3,788,455 | 1/1974 | Dieckmann | 198/182 |

FOREIGN PATENTS OR APPLICATIONS

| | | | |
|---|---|---|---|
| 571,552 | 3/1959 | Canada | 198/189 |
| 1,481,675 | 6/1966 | France | 198/177 R |
| 537,153 | 4/1955 | Belgium | 198/177 R |

Primary Examiner—Robert J. Spar
Assistant Examiner—James M. Slattery
Attorney, Agent, or Firm—Ancel W. Lewis, Jr.

[57] ABSTRACT

In a conveyor system having a flexible material-supporting belt made up of a plurality of sections connected end to end, there is provided a single, generally channel-shaped track for establishing a selected course of travel for the belt and an arrangement for moving the belt along the track inclusive of a pulling chain and a plurality of roller carriages on rollers affixed to the pulling chain at selected spaced intervals along the chain, the chain and rollers being entirely enclosed inside the track with the track providing entirely inside track surfaces for the rollers. Each roller carriage fastens to the belt and there may be provided a minimum spacing between roller carriages preferably one roller carriage per belt section with a roller carriage attached to each vertical chain link section placing a roller carriage at each pair of abutting ends of each belt section. The track configuration and roller mountings include combinations of vertical, horizontal and inclined dispositions for different applications.

13 Claims, 10 Drawing Figures

FLEXIBLE BELT CONVEYOR SYSTEM WITH TRACK-CONTAINED ROLLER, CARRIER AND CHAIN ASSEMBLY

FIELD

This invention relates to conveyor systems and more particularly to improvements in the conveyor systems that are specifically adapted to move a variety of materials on a flexible belt in three dimensions through a curved path.

BACKGROUND

A variety of different styles of conveyor systems utilizing a flexible belt that moves in three dimensions through a curved path have heretofore been provided and afford several features and advantages over other types of known conveyors presently in use for moving materials. A conveyor system of the type described herein has a flexible, material-supporting belt designed and supported to pass in three dimensions through curves wherein there is utilized a track, a pulling member and a plurality of spaced roller carriages affixed between the belt and pulling member. The movement in three dimensions refers to the capability of the belt moving up and down, laterally, and with substantial rotation about its longitudinal axis along the course of travel through a curved path while supporting the load from below the load. The features and advantages of a conveyor system of the present invention over other types commonly in use include the capability of negotiating horizontal, vertical and spiral curves, moving goods up relatively steep grades, the provision of side discharges without sloping or slowing of the conveyor and the capability of carrying loads in either direction.

In prior known conveyor systems presently in use, there is provided a track with both inside and outside track surfaces, a track pulling chain or the like and a plurality of roller carriages affixed at spaced intervals between the belt and the pulling chain, the carriages and in turn the belt being moved by the movement of the pulling chain with the roller surfaces and chain being exposed to corrosive and abrasive materials and the like. Each roller carriage has four rollers arranged two on each side of the pulling chain, one roller on each side of the chain has its axis disposed horizontally and the other roller has its axis disposed vertically. The horizontal rollers bear on the bottom flanges of the track while the vertical rollers bear on the outside track surfaces. In this arrangement, the roller carriages are relatively heavy and are usually spaced at about one roller carriage for each five belt sections leaving a substantial space between roller carriages.

With a roller arrangement in which there are pairs of both inside and outside rollers relative to the track, the bottom surface of the track is the only surface on which support legs and other support structure can be affixed. Moreover, the wall thickness of the track has to be within certain limits and in some instances a very thick track wall is necessary for special features such as a side discharge or the like. This prior art arrangement does not provide for the taking of the roller carriage out of the track except when a tension or drive station or a combination thereof are provided. The rollers and chain located outside the track result in an abrasive material or other undesirable corrosive or foreign materials being free to enter between the roller and the chain links resulting in undue wear on the rollers surfaces and the chain links. Moreover, with a roller arrangement disposed outside the track the roller carriage has to have additional structure to hold the rollers so that the roller carriages become relatively heavy. In arrangements where there is substantial spacing between roller carriages there is a limit as to the radius curves and substantial tension is required on the chain to avoid undue sagging.

Accordingly, it is an object of this invention to provide an improved conveyor system that will readily move in three dimensions along a curved path.

Another object of this invention is to provide an improved conveyor characterized by a unique construction and arrangement of roller carriage and rollers in which the rollers exert lateral and vertical thrust against the track entirely from within the track against the inside surfaces of the track.

Yet another object of this invention is to provide an improved conveyor system characterized by smaller and lighter roller carriages using more per length of belt that will travel around smaller radius curves and requires less chain tension and had less chain sag between roller carriages.

Yet a further object of this invention is to provide a novel conveyor system in which there are no external carriage rollers but the rollers and the pulling chain are entirely within the track and inside of the track is closed off to provent abrasive and like foreign materials from affecting the bearing surfaces supporting the carriage rollers and the pulling chain links.

Other objects, advantages and capabilities of the present invention will become more apparent as the description proceeds taken in conjunction with the accompanying drawings, in which.

DESCRIPTION OF THE PREFERRED EMBODIMENTS

Figure 1:
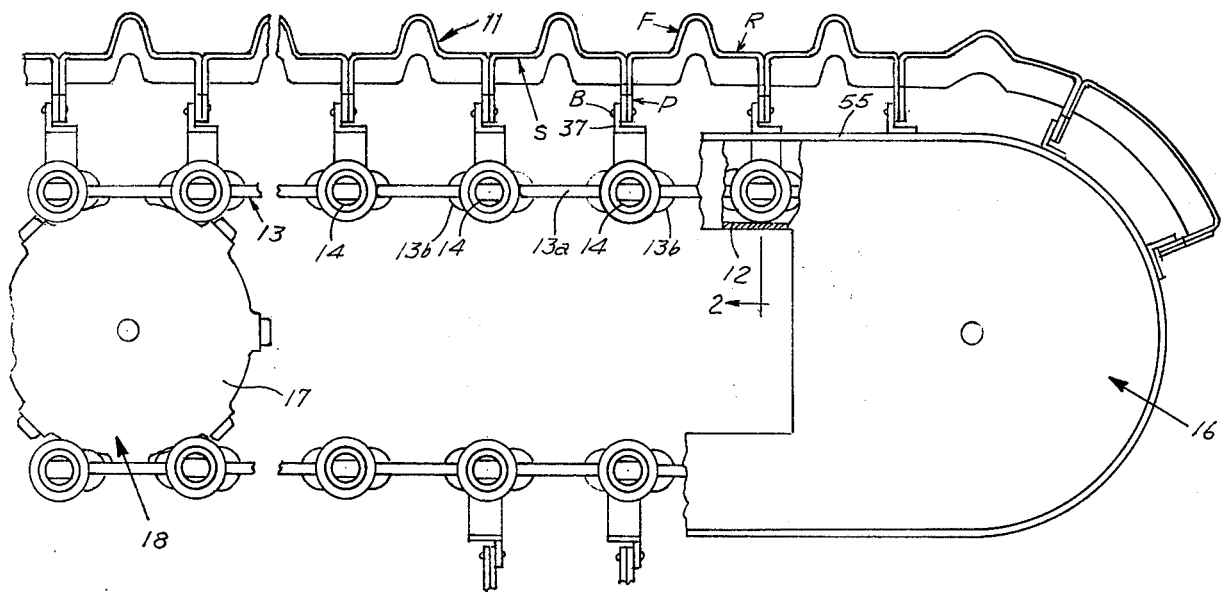
FIG. 1 is a generally schematic side elevation view of portions of a conveyor system showing both upper and lower runs embodying features of the present invention.

Referring now to the drawings, in FIG. 1 there is shown a conveyor system embodying features of the present invention which in general is comprised of an endless belt 11 made up of a plurality of similar interconnected material-supporting belt sections S for supporting the material being conveyed and a single, generally channel-shaped track 12 in an endless configuration establishing a course of travel for the belt 11. The belt is moved by a pulling chain 13 located entirely inside the track 12 having alternating horizontal links 13a and vertical links 13b driven by a suitable power source in a conventional manner while a plurality of roller carriages 14 are fastened at selected spaced intervals to the pulling chain 13 and as specifically shown there is one roller carriage for each belt section S with the abutting ends of each belt section being attached to each successive vertical link 13b of the chain with the roller carriages each being affixed to the belt at their upper ends as described in detail hereinafter. In the system shown in FIG. 1 the pulling chain extends over a drive sprocket on a drive head 16 associated with a source of rotating power at one end of the belt and a tensioning sprocket 17 on a tensioning head 18 at the other end of the belt in a conventional manner. The tensioning head functions to change the tension in the pulling chain.

The endless belt 11 is comprised of a plurality of similar sections S connected end to end at each end by bolt fasteners or the like. Each belt section has a fiberless rubber or rubberized portion R vulcanized to a pan-shaped steel plate P, the places P being fastened together by bolts B that attach to the carriages as described fully hereinafter. On the conveying surface, a vertical fold F is molded into the rubberized portion R between the end plates P so that when turning curves, the folds F allow the inner side of the belt to compress and the outer side to stretch. The details of construction of a belt and belt sections that is suitable for use in the present invention is fully described in detail in U.S. Pat. No. 2,818,962.

As above noted in FIG. 1 there is shown using a channel-shaped track and carriage support rollers entirely within the track, a preferred ratio of one roller carriage for each belt section and a ratio of two chain links for each roller carriage and each belt section. This represents the use of more roller carriages and a shorter spacing between roller carriages than those heretofore provided. In the typical prior art roller carriage above described because of the weight of the roller carriage that supported rollers both inside and outside the track they were spaced at about one carriage per five belt sections. In terms of distance, each belt section has a length of eight inches and each chain link a pitch length of four inches. While the ratio of one roller carriage per belt section represents the minimum spacing between roller carriages that can be achieved and advantageously used for some applications but it is understood that for other applications fewer roller carriages and thus greater spacing between roller carriages may be desirable and can also be carried out with the present invention.

Figure 2:
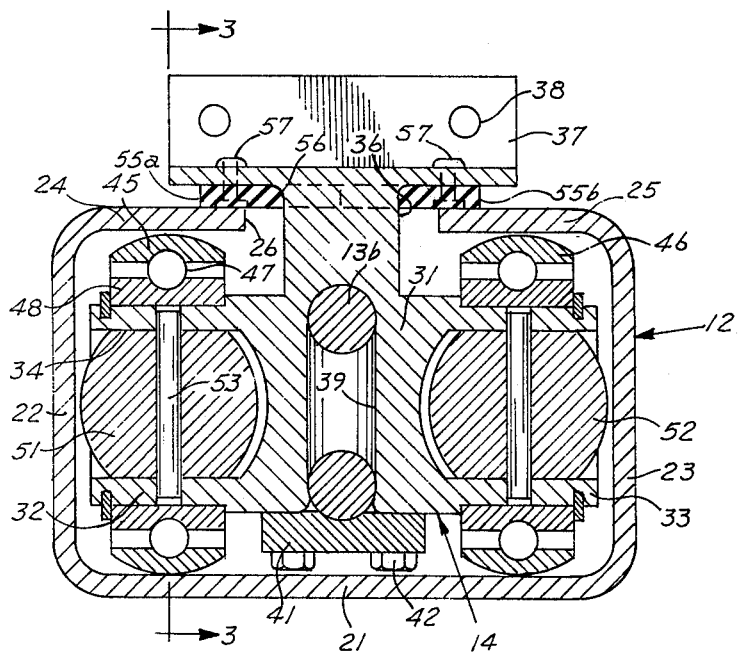
FIG. 2 is a vertical sectional view taken along lines 2—2 of FIG. 1 with the belt removed.

The track 12 shown in FIG. 2 is generally channel-shaped and symmetrically arranged on each side of a vertical center line and as shown is comprised of a horizontally disposed flat bottom wall 21, a pair of opposed, spaced, vertically disposed side walls 22 and 23 extending up from opposite ends of the bottom wall and a pair of inturned top walls 24 and 25 extending inwardly from side walls 22 and 23, respectively, that terminate so as to form a centrally disposed top slot 26 extending along the lengthwise extent of the track.

Figure 3:
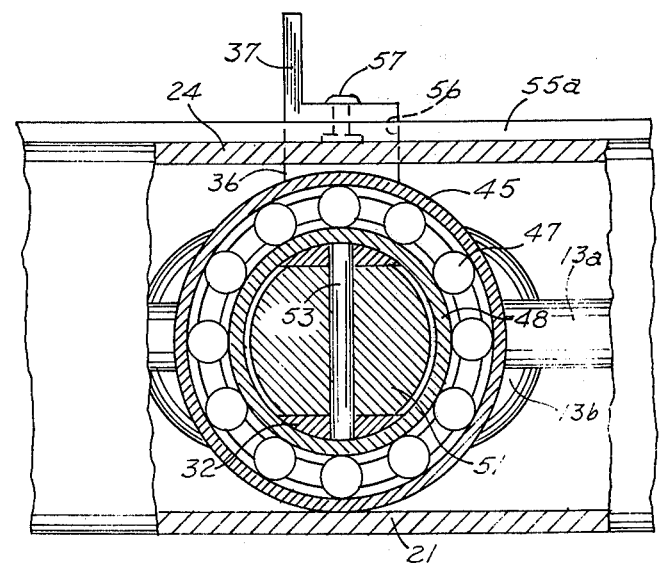
FIG. 3 is a sectional view taken along lines 3—3 of FIG. 2.

Each of the roller carriages 14 that roll along the track 12 are comprised of a carriage body, preferably formed as a single body in the form of FIGS. 1 through 3 having a main body portion 31 from which project a pair of laterally projecting opposed side portions 32 and 33 of generally circular contour, each side portion having a central recess 34 bounded by an upper flange section and a lower flange section, a neck portion 36 of reduced size that projects up from the main body portion 31 through the top slot 26 and terminates in a bracket 37 of right angle cross section provided with holes 38 that fastens to the abutting fastening plate P at the abutting ends of two belt sections S by bolt fasteners B. The main body portion 31 has an inverted U-shaped center slot 39 opening along the bottom thereof through which a vertical link 13b of the pulling chain extends and the chain is held in place by a removable bottom cap 41 shown as being held in place by a pair of bolt fasteners 42.

A horizontal roller 45, rotatable about a horizontal axis, is mounted on side support 32 and in a like manner a horizontal roller 46 is mounted on side portion 33 with these rollers having peripheral surfaces that bear on the inside of the top or bottom walls of the track to transmit the vertical thrust of the material on the belt and the chain to the inside surfaces of the track. The horizontal rollers 45 and 46 are shown to be mounted on similar ball bearing structure. Referring to roller 45, it is mounted on a plurality of circumferentially spaced ball bearings 47 mounted in a race 48 affixed to the outer periphery of the associated side portion 32.

Vertical rollers 51 and 52 of the sleeve bearing type and preferably nylon or the like are mounted within recesses in side portions 32 and 33, respectively. The vertical rollers are rotatably mounted in a similar manner and with reference to roller 51, it is mounted on a central journal shaft 53 with its peripheral surfaces bearing on the inside of the side walls of the track to transmit the lateral thrust of the load on the belt and chain to the inside track surfaces of side walls 22 and 23.

A movable closure for the slot 26 in the track is provided by an elongated flexible flap 55 of generally rectangular cross section with flat surfaces that is split longitudinally into two sections 55a and 55b and the two sections making up the flap and has central openings 56 that are spaced apart along the flap to receive the neck of each roller carriage. Each section is shown as affixed to the underside of the fastening flange 37 by a rivet-type fastener 57 and rests on the top surfaces of the track to close the top slot as the belt is moved relative to the track. It is understood that the closure for the slot is advantageous for keeping out some materials being conveyed but is an optional feature that is not essential for all applications.

Figure 5:
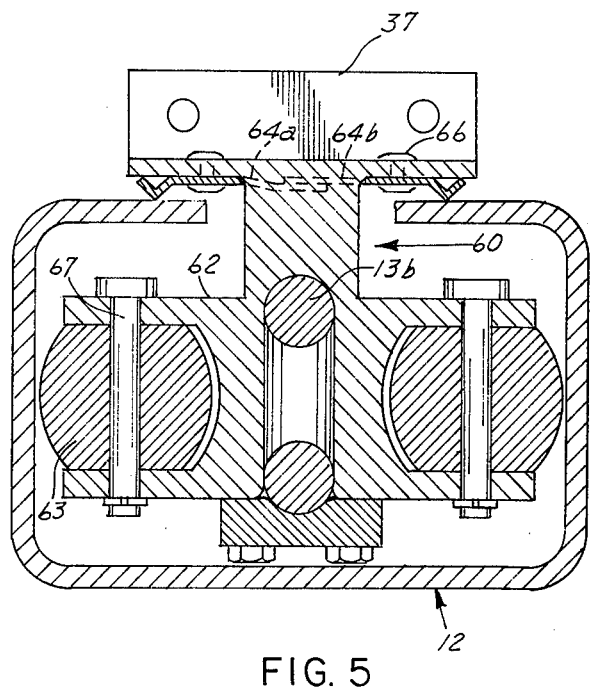
FIG. 5 is a vertical sectional view taken along lines 5—5 of FIG. 4 through the roller carriage with the pari of vertical rollers.
Figure 4:
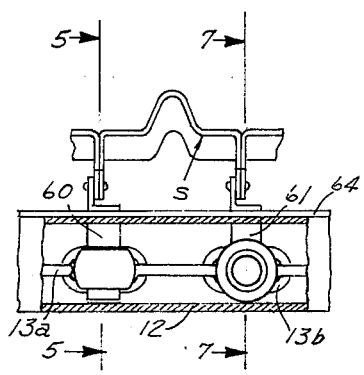
FIG. 4 is a fragmentary generally schematic side elevation view of a form of the invention showing a portion of the upper run using separate carriages for alternating pairs of horizontal and vertical roller sets.
Figure 6:
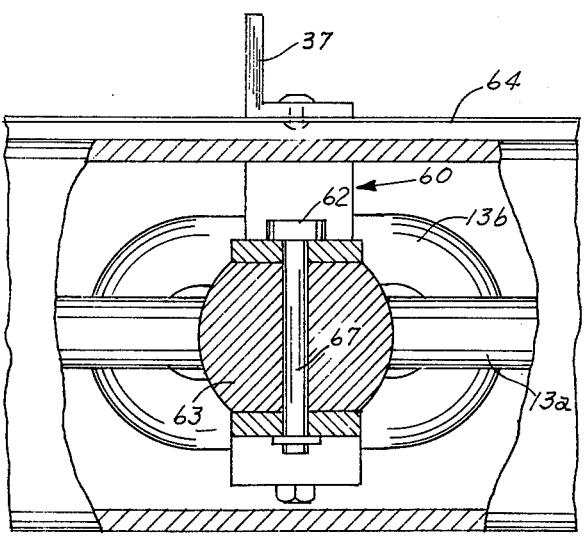
FIG. 6 is a sectional view taken along lines 6—6 of FIG. 5.
Figure 7:
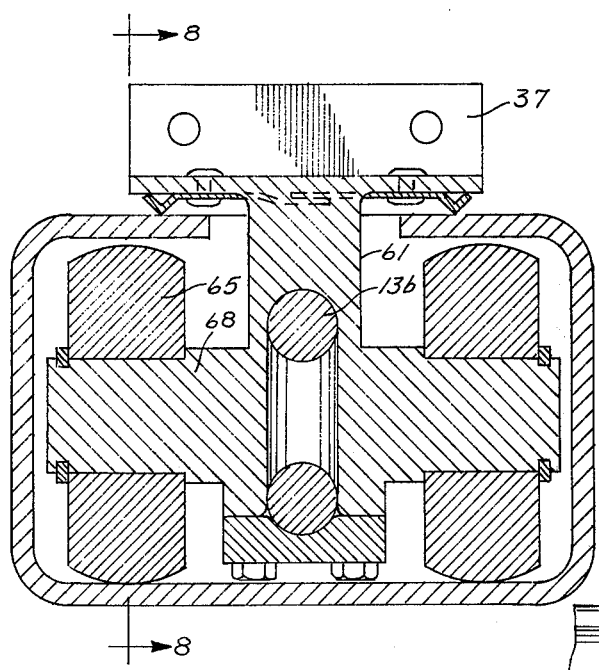
FIG. 7 is a vertical sectional view taken along lines 7—7 of FIG. 4 through the roller carriage with a pair of horizontal rollers.
Figure 8:
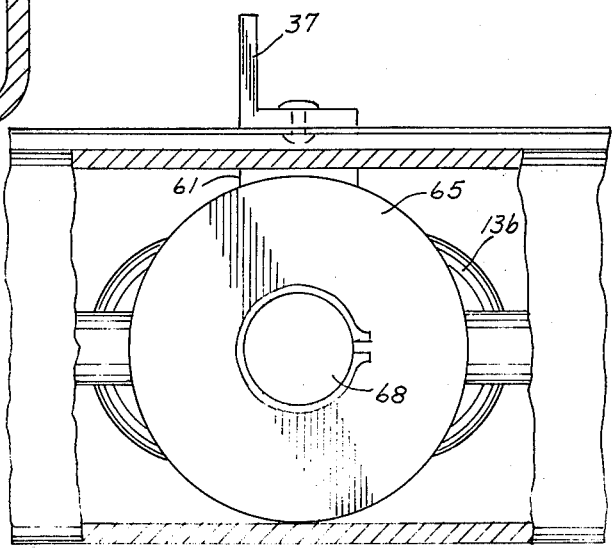
FIG. 8 is a sectional view taken along lines 8—8 of FIG. 7.

In another roller carriage and roller arrangement shown in FIGS. 4 through 6 there is provided a track similar in shape to that above described in which a pair of roller carriages 60 and 61 spaced from one another along the track 12 and again are preferably disposed with one roller carriage per belt section and per vertical chain link as shown in FIG. 4. The roller carriage 60 has a pair of opposed similar side portions one of which is designated by numeral 62 for reference purposes and is movably supported on a set of vertical, sleeve-supported rollers 63 rotatable about a vertical axis while carriage 61 is movably supported on a set of sleeve-supported horizontal rollers 65 rotatable about a horizontal axis. Each vertical roller is mounted in a similar manner and is mounted on a central vertical journal shaft 67 affixed to the side portion at its upper and lower ends. Each horizontal roller 65 is mounted in a similar manner and is supported on the side portion 68 which forms a hub. The use of a pair of the carriages with alternating horizontal and vertical rollers on separate carriage bodies allows the use of a lighter weight and simpler carriage body design since only one set of bearings is attached to each of the laterally projecting side portions of the roller carriage. An alternative form of closure for sealing off the inside of the track is shown in FIGS. 4 through 6. Again the closure is in the form of an elongated flexible flap 64 that is split into two sections 64a and 64b. Each flap has a flat section that is affixed to the fastener flange 37 by a rivet and a downwardly bowed section that bears against the top of the track outwardly of the slot. The inner ends of the two sections overlap. The thickness of this flap is considerably less than the spacing between the flanges and the track to allow considerable flexure in the closure.

The above described arrangements with the rollers entirely inside the track and particularly the arrangement shown in FIGS. 4 through 8 using carriages with alternating horizontal and vertical rollers makes possible a smaller and lighter roller carriage than heretofore provided. This reduces the cost of construction and allows more roller carriages to be used at closer intervals between roller carriages. As a result each roller takes a smaller force and relatively light load bearings such as nylon, sleeve-type bearings can be used. Other advantages of more roller carriage per length is that the conveyor will travel around smaller radius curves and less chain tension is required because the chain does not sag between roller carriages. There is also less wear on the chain because of a smaller angle between chain links.

Figure 9:
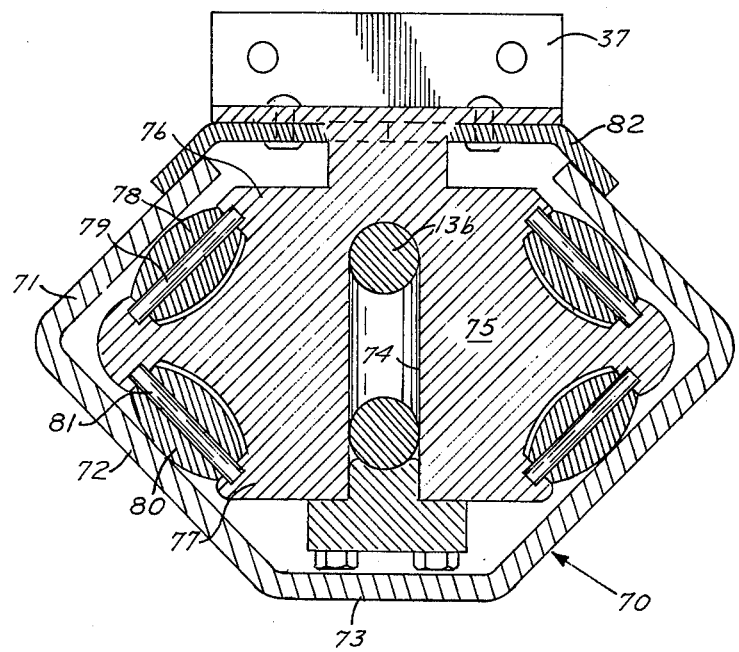
FIG. 9 is a vertical sectional view of another form of track, rollers, and roller carriage arrangement having all track surfaces arranged on an incline.

Referring now to FIG. 9, there is shown another form of the invention characterized by the use of another form of generally channel-shaped track having inclined track and roller dispositions in which a track 70 is arranged so that on each side of a vertical center line there is an upper section 71 that extends in and up at a 45° angle to the vertical and a lower section 72 that extends down and in from the outer end of the upper section at a 45° angle to the vertical and a horizontal bottom section 73. The roller carriage for this form has a main body portion 75 with a centrally disposed slot 74 opening through the bottom thereof to receive a vertical link 13b of the pulling chain and a pair of opposed side portions having an upper side portion 76 arranged on a 45° angle to the vertical and complementary to the upper track section 71 and a lower side portion 77 on a 45° angle to be complementary with the lower track section 72. An upper roller 78 is rotatably mounted on a journal shaft 79 in a recess in the upper side portion 76 to bear against the inside surface of the upper track section. In a like manner a lower roller 80 is rotatably mounted on a journal shaft 81 in a recess in the lower side portion 77 on a 45 degree angle to bear against the inside surface of the lower track section 72.

Again, a closure in the form of a flexible flap 82 is made in two sections fastened to the flange 37 by rivets that abut along the inner ends and extend down and out over the upper portions of the track to form a moving seal. In this form all of the bearings carry a portion of both the horizontal and vertical thrusts resulting from a load on the moving belt and the tension on the chain.

Figure 10:
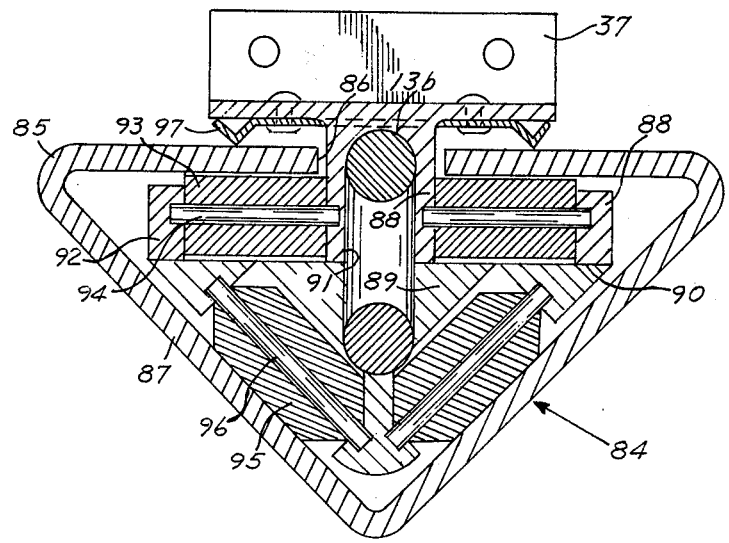
FIG. 10 is a vertical sectional view of yet another form of track, roller and roller carriage arrangement using horizontal and inclined track surfaces.

In yet another form of the present invention shown in FIG. 10, a generally channel-shaped track 84 has a horizontally disposed upper track section 85 on each side of a vertical center line to form a slot 86 in the top thereof together with a lower track section 87 on each side of the vertical center line that extends down and in from an associated top track section on an angle of 45° to the vertical. In this form the roller carriage has a main body portion made in two separate parts, an upper part 88 and a lower part 89 that are held by fasteners such as bolts (not shown) and separate along horizontal parting line 90 with a central slot 91 in both upper and lower parts for the vertical link 13b of the pulling chain. A side portion 92 of the upper part supports a horizontal roller 93 in a recess therein on a journal shaft 94 to engage the inside surface of the upper track section 85 and an inclined roller 95 in a recess therein on a journal shaft 96 on a side portion of the lower part 89 to engage the inside inclined surface of the lower track section 87. The seal 97 is of the type above described with reference to FIGS. 4 through 8.

In each of the above forms it will be observed that the center line of each of the carriage rollers is in a plane through the center of the links of the pulling chain. This feature has been found to afford more stability and when the belt is twisted for a side discharge it is easier to twist without displacing the location of the pulling chain.

Although the present invention has been described with a certain degree of particularity, it is understood that the present disclosure has been made by way of example and that changes in details of structure may be made without departing from the spirit thereof.

What is claimed is:
1. In a conveyor system capable of moving up and down, laterally, and with substantial rotation about its longitudinal axis along the course of travel through a curved path while supporting a load from below the load, the combination comprising:

a flexible, material-supporting belt made up of a plurality of repetitive belt sections arranged end to end;

a generally channel-shaped track having inside track surfaces arranged for establishing a selected course of travel for the belt, said track including a top run in which the belt is arranged for supporting a load thereon from below the load, said top run having a track section with a center slot in a top wall and a closed bottom wall; and belt moving means including a pulling chain adapted to be moved by a source of motive power, said pulling chain having a series of generally ellipsoidal-shaped alternating horizontal and vertical interconnnected links extending along the inside of the track and a plurality of roller carriages releasably affixed at selected spaced intervals to the link chain to space said roller carriages along the track, each said roller carriage having a main body portion, a pair of side portions projecting laterally outwardly from opposite sides of said main body portion and a neck portion extending from said main body portion through and beyond the center slot and affixed to the belt, each said main body portion having a center slot centered so that the geometric center of one of said chain links positioned in said center slot is in the geometric center of said main body portion, at least one support roller mounted on each of said side portions, said support rollers being contained entirely within the track and bearing on the inside track surfaces as said support rollers move inside said track, said side portions being symmetrically arranged on each side of a horizontal center line through the geometric center of said main body portion whereby load forces applied to the main body portion from the rollers are at all times in a direction toward the geometric center of the associated main body portion.

2. In a conveyor system as set forth in claim 1 wherein there is one roller carriage for each belt section and each successive vertical link of the chain is affixed to a roller carriage, the roller carriage in turn being connected to abutting ends of each of two adjacent belt sections.

3. In a conveyor system as set forth in claim 1 further including a closure means for the slot, said closure means being in the form of a flexible flap affixed to the carriages and bearing against an upper surface of the track to close the top slot of the track while said roller carriages are moving therealong.

4. In a conveyor system as set forth in claim 1 wherein said track is generally channel-shaped and said top run having a horizontal bottom wall, a pair of opposed vertical side walls and a pair of inturned top wall portions forming a central top slot.

5. In a conveyor system as set forth in claim 4 wherein each said roller carriage supports a roller on each side of a vertical center line of the carriage that is mounted to rotate about a vertical axis to transmit lateral thrust produced by the moving belt and pulling member to the inside track surfaces of the side walls of the track and supports a roller on each side of a vertical center line of the carriage that is mounted to rotate about a horizontal axis to transmit vertical thrust produced by the moving belt and pulling member to the inside track surfaces of the bottom and top wall portions of the track.

6. In a conveyor system as set forth in claim 4 wherein said roller carriages are arranged in pairs spaced a selected distance from one another along the belt, one of said pairs of roller carriages having a roller supported on each side of a vertical center line of the carriage that is mounted to rotate about a vertical axis to transmit lateral thrust produced by the moving belt and pulling member to the inside track surfaces of the side walls of the track and the other of said roller carriages of each pair having a roller supported on each side of a vertical center line of the carriage that is mounted to rotate about a horizontal axis to transmit vertical thrust produced by the moving belt and to the inside track surfaces of the bottom and top wall portions of the track.

7. In a conveyor system as set forth in claim 1 wherein said top run of said track has an upper inclined section and a lower inclined section on each side of a vertical center line, each said upper inclined section being inclined upwardly and inwardly at a selected angle to the vertical, said upper inclined sections terminating at their inner end to form a top center slot and each said lower inclined section being inclined downwardly and inwardly from an associated upper section at a selected angle to the vertical to form inclined inside track surfaces to guide the roller carriages.

8. In a conveyor system as set forth in claim 7 wherein each roller carriage supports an upper roller on each side of a vertical center line of the carriage mounted on an inclined axis to transmit thrust produced by the moving belt to the adjacent upper inclined section of the track and a lower roller on each side of a center line of the carriage mounted on an inclined axis to transmit thrust produced by the moving belt to the adjacent lower inclined section of the track.

9. In a conveyor system as set forth in claim 1 wherein said track has a horizontal upper section and a lower inclined section on each side of a vertical center line, said upper sections terminating at their inner ends to form a top slot, each said lower section being inclined downwardly and inwardly from the outer end of the associated upper section at a selected angle to form inclined inside track surfaces to guide the roller carriages.

10. In a conveyor system as set forth in claim 9 wherein each roller carriage supports an upper roller on each side of a vertical center line of the carriage mounted on a horizontal axis to transmit thrust produced by the moving belt and pulling member to the adjacent lower inclined section of the track.

11. In a conveyor system as set forth in claim 1 wherein the roller carriage is split along a parting line to form a pair of separable parts to afford access to the rollers supported thereon.

12. In a conveyor system capable of moving up and down, laterally, and with substantial rotation about its longitudinal axis along the course of travel through a curved path while supporting a load from below the load, the combination comprising:

a flexible, material-supporting belt made up of a plurality of interconnected belt sections;

a generally channel-shaped track for the belt having inside track surfaces for establishing a selected course of travel for the belt, said track including a top run in which the belt is arranged for supporting a load thereon from below the load, said top run having a track section with a center slot in a top wall and a closed bottom wall;

a pulling chain adapted to be moved in either direction, said pulling chain having a series of generally ellipsoidal-shaped alternating horizontal and vertical chain links;

a plurality of roller carriages releasably affixed at selected spaced intervals to selected vertical links of the pulling chain to space said roller carriages along the track, each of said roller carriages having a main body portion, a pair of side portions projecting laterally outwardly from opposite sides of said main body portion and a neck portion extending through and above the slot and having a bracket affixed to the belt, each said main body portion having a center slot centered so that the geometric center of one of said chain links positioned in said center slot is in the geometric center of said main body portion, at least one support roller mounted on each of said side portions, said support rollers being contained entirely within the track and bearing on the inside track surfaces as said support rollers move inside said track, said side portions being symmetrically arranged on each side of a horizontal center line through the geometric center of said main body portion whereby load forces applied to the main body portion from the rollers are at all times in a direction toward the geometric center of the associated main body portion; and closure means operatively associated with the roller carriages sealing off the inside of the track at said center slot so that the carriage rollers and pulling chain are enclosed therein.

13. In a conveyor system capable of moving up and down, laterally, and with substantial rotation about its longitudinal axis along the course of travel through a curved path while supporting a load from below the load and having a drive sprocket driven by a bi-directional drive head and chain tensioning means adapted to move in three dimensions through curves, the combination comprising:

- a material-supporting endless belt made up of a plurality of similar, flexible belt sections connected end to end, each said belt section having a flexible fold and rigid end plates at each end, the end plates of each adjacent belt sections being fastened together;
- a single, generally channel-shaped track for the belt having inside track surfaces for establishing a selected course of travel for the belt, said track including a top run in which the belt is arranged for supporting a load thereon from below the load, said top run having a track section with a center slot in a top wall and a closed bottom wall;
- a pulling chain adapted to be moved in either direction by the drive head and tensioned by said tensioning means, said pulling chain being inside the track and having a series of generally ellipsoidal-shaped alternating horizontal and vertical chain links with one vertical chain link per belt section;
- a plurality of roller carriages with one roller carriage for each belt section, each roller carriage being releasably affixed to a vertical chain link to be spaced apart and moved by the pulling chain, each said roller carriage having a main body portion, a pair of side portions projecting laterally outwardly from opposite sides of said main body portion and a neck portion extending through and beyond the track slot and terminating in a bracket attached to the end plates to two adjacent belt sections, each said main body portion having a center slot centered so that the geometric center of one of said chain links positioned in said center slot is in the geometric center of said main body portion, at least one support roller mounted on each of said side portions, said rollers being contained entirely within the track and bearing on the inside track surfaces as said support rollers move inside said track, said side portions being symmetrically arranged on each side of a horizontal center line through the geometric center of said main body portion whereby load forces applied to the main body portion from the rollers are at all times in a direction toward the geometric center of the associated main body portion; and
- a flexible closure flap affixed to the roller carriages and encompassing the neck portion and extending over and in engagement with the upper portion of the track to close off the center slot and enclose the carriage rollers and chain entirely within the track.

* * * * *